US008157106B2

(12) United States Patent
Rosenblatt et al.

(10) Patent No.: US 8,157,106 B2
(45) Date of Patent: Apr. 17, 2012

(54) GARBAGE CONTAINER WITH PROTECTED DRAIN

(76) Inventors: Michael Alan Rosenblatt, New Orleans, LA (US); Peter Ashley Bourgeois, New Orleans, LA (US); Michael David Lonegrass, River Ridge, LA (US)

( * ) Notice: Subject to any disclaimer, the term of this patent is extended or adjusted under 35 U.S.C. 154(b) by 417 days.

(21) Appl. No.: 11/625,397

(22) Filed: Jan. 22, 2007

(65) Prior Publication Data

US 2008/0173336 A1 Jul. 24, 2008

(51) Int. Cl.
*B01D 29/03* (2006.01)

(52) U.S. Cl. ......................... 210/464; 210/467; 220/908

(58) Field of Classification Search .................. 210/464, 210/465, 467–469; 220/908
See application file for complete search history.

(56) References Cited

U.S. PATENT DOCUMENTS 1,801,934 A * 4/1931 Pearson ........................ 210/464
6,761,271 B1 * 7/2004 Cresswell ..................... 210/456

FOREIGN PATENT DOCUMENTS

JP 8189151 A * 7/1996
JP 08189151 A * 7/1996

* cited by examiner

*Primary Examiner* — Nam Nguyen
*Assistant Examiner* — Denise R Anderson
(74) *Attorney, Agent, or Firm* — Joel I. Rosenblatt

(57) ABSTRACT

A container is shown with a sump and a strainer separating the container interior from the sump. The sump is provided with a drain for draining liquid in the container from any solid material.

20 Claims, 4 Drawing Sheets

GARBAGE CONTAINER WITH PROTECTED DRAIN

CROSS REFERENCE TO RELATED APPLICATIONS

Benefit of Provisional Application 60/766,397, filed Jan. 17, 2006, is claimed under the provisions of 35 U.S.C. 120.

FIELD OF INVENTION

This is an innovation in containers for temporary outdoor storage of garbage or other disposable organic or non-organic, materials, subject to absorption of liquid, particularly rain water.

BACKGROUND

Garbage collection, while routine, requires the temporary storage of absorbent materials, typically biodegradable by ambient bacteria, whose activity is enhanced by a liquid medium. In typical use, garbage cans are placed in the ambient for collection, sometimes a day or more in advance of pickup and disposal. While cans are typically closed with lids or covers designed to prevent water entry, for example from rainfall, the covers may become distorted or removed by happenstance, allowing rainfall to enter, enhancing the bacterial action, disease and the weight of the loaded can.

Accordingly, once liquid enters the can, from rainfall, or is placed in the can, for example by refuse or garbage containing liquid, the liquid remains in the can, adding weight to the can's contents, making pickup more difficult and increasing the threat of disease by water or air borne microbiological contaminants.

Cans and other containers for temporary storage of an organic or inorganic mass or composite material, which can absorb liquids, have lacked an efficient way of diverting water, for example from rainfall, or from liquid within the material, away from the material stored within the container, allowing the liquid to be drained into a separated space, for separated storage of the liquid for disposal or for continuous draining into ambient space or another container. One example of a vented container for organic waste is disclosed in U.S. Pat. No. 5,899,468. The container includes a perforated false bottom to elevate the biomass and to allow air to circulate through the contained biomass. However, the organic waste container as shown in U.S. Pat. No. 5,899,468, lacks a facility for holding liquid which may enter the container and which may be drained by a drain plug or other means for a controlled opening the container space with the stored or drained liquid.

SUMMARY

Accordingly, one object of this invention is a container for temporary storage of an organic or inorganic, mass or composite and for draining away from the mass or composite, any liquid which is contained with the mass or composite, when placed into the container or which enters the container from a source exterior to the container.

It is another object of this invention to provide a container with a sump channel for holding liquid draining from the can interior, until there may be safe disposal of the liquid.

It is another object of this invention to provide a means for controlling the venting of the sump channel so any liquid held in the bottom of the can, as may have drained from the can interior, may be safely removed.

It is still another object of this invention to provide a straining means, for example, by a grating or by perforations or a mesh, forming a strainer for separating the part of the container holding the mass or composite from the sump channel, while allowing the liquid to pass into the sump channel.

It is still another object of this invention to provide a means for cleaning the container by back flushing through the drain hole and into sump channel and the straining means.

It is still another object of this invention to provide a removable straining means which may be inserted into the bottom of the container to form an integral part of the sump channel and which may be removed for cleaning.

It is still another object of this invention to provide a straining means which may be placed in a cooperative relationship with a sump channel and which may provide straining surfaces, orthogonal displaced, as for example in vertical and horizontal planes.

These and other advantages of the invention may be seen in the following detailed description of a preferred embodiment.

What is disclosed is a self draining container for draining liquid material, from a composite of liquid and solid, materials comprising, a. a container;

b. said container comprising a top, bottom and a side wall;

c. said container comprising an interior;

d. said container bottom including a sump channel disposed in said container bottom:

f. a strainer placed in said sump channel and separating said interior from said sump channel;

g. said sump channel comprising an outlet channel, whereby liquid draining from said interior past said strainer to said sump channel, flows through said outlet channel to ambient.

Further disclosed is the self draining container, wherein, said container bottom comprises a container bottom gradient from said container side wall to said sump channel.

Further disclosed is the self draining container, wherein, said sump channel comprises a sump channel bottom, a sump channel front wall and a sump channel back wall and wherein said container bottom gradient is from said sump channel back wall to said sump channel front wall.

Further disclosed is the self draining container, wherein, said strainer comprises openings to pass liquid material from said interior to said outlet channel and to substantially hold solid material from passing into said sump channel.

Further disclosed is the self draining container, wherein, said strainer comprises a top surface and said top surface comprises gradient substantially in said direction of said container bottom gradient.

Further disclosed is the self draining container, wherein, said outlet channel is proximate said sump channel front wall and said sump channel bottom comprises a gradient from said sump channel back wall to said sump channel front wall.

Further disclosed is the self draining container, wherein, said container bottom comprises a container bottom outlet communicating with said outlet channel.

Further disclosed is the self draining container, comprising a stop valve and wherein said stop valve comprises a stop valve opening arranged to communicate with said container bottom outlet for draining liquid from said container bottom.

Further disclosed is the self draining container comprising a plug arranged to be removable insertable in said outlet channel and wherein said stop valve is integral with said plug.

Further disclosed is the self draining container, wherein, said sump channel comprises side walls and said strainer is arranged to fit in said sump channel and between said sump channel front wall, said sump channel back wall, and said sump channel side walls.

Further disclosed is the self draining container, wherein, said strainer is arranged to be integral with said container or to be removable from said container.

Further disclosed is the self draining container, wherein, said strainer includes said strainer openings in said top surface.

Further disclosed is the self draining container, wherein, said strainer includes said strainer openings in said side walls.

Further disclosed is the self draining container, wherein, said outlet channel is disposed below said sump channel.

Further disclosed is the self draining container, wherein, said outlet channel is disposed substantially at the level of said sump channel.

Further disclosed is the self draining container, wherein, said sump channel front, back and side, wall, surfaces are continuous with said container bottom.

DESCRIPTION

A preferred embodiment of the invention is shown, according to the disclosed inventive principles, in FIGS. 1 to 5.

Figure 1:
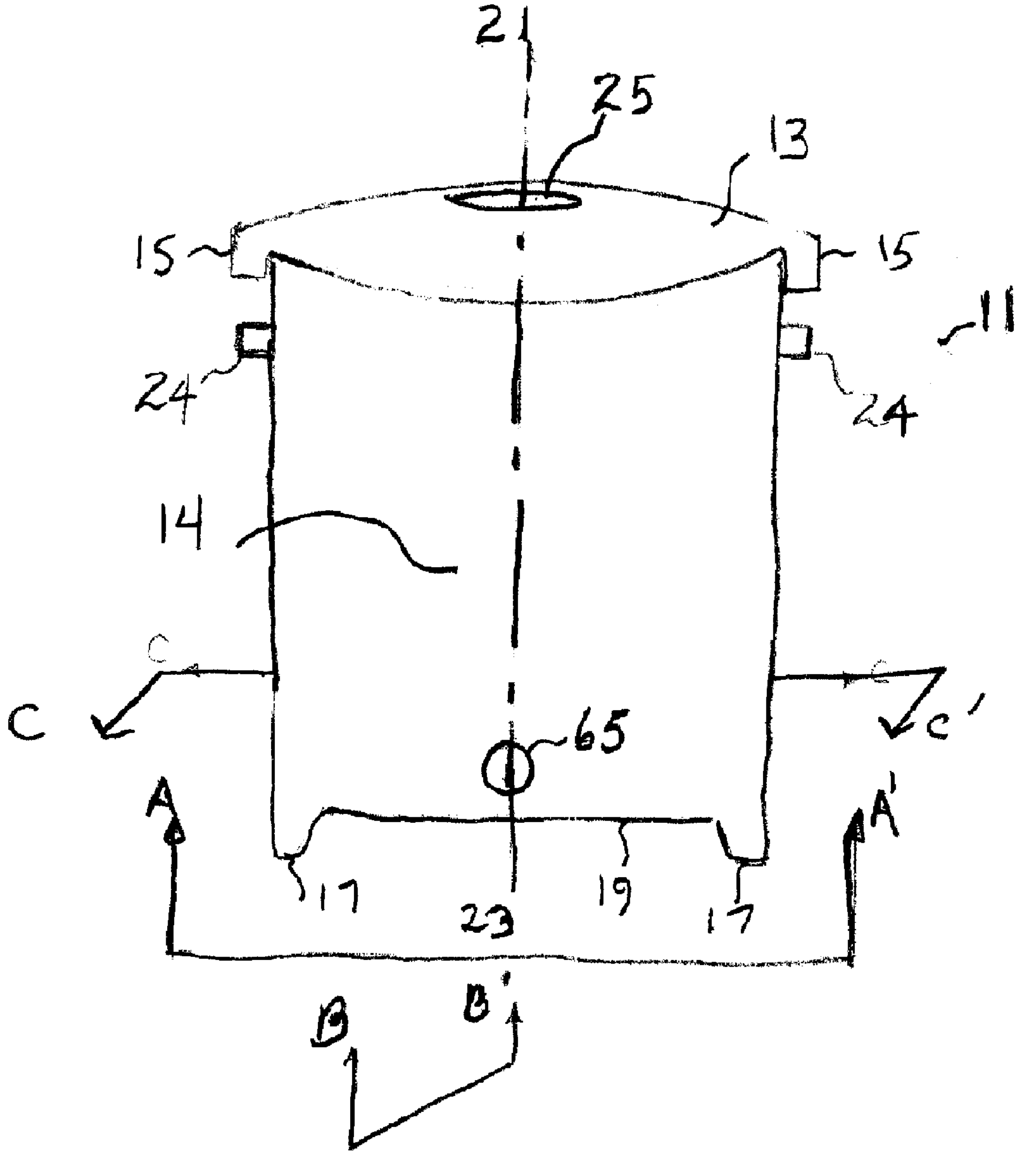
FIG. 1 is a front view of the device showing the drain hole and the sectional lines for the section views of FIGS. 2 to 4.

As shown in FIG. 1, a container, shown in a preferred embodiment as a conventional garbage can 11, as is well known for the temporary storage and pick up of garbage for disposal. The material stored in the container may be conventional biodegradable materials, liquid absorbing or non-absorbing or inorganic or other non-absorbent materials. The container 11 with its interior shown generally by numeral 14, in FIG. 2, may be fitted with a cover, 13, shown schematically with locking ears 15, and a rimmed bottom 17, for supporting the container 11, and for elevating the can 11, bottom 19.

As would be known to those skilled in the art, the container, shown in a cylinder, may be any shape in cross section, circular, square, or varying in cross sectional shape along the axis 21, 23.

An indentation, shown as 25, forms a handle in cover 13. However, as would be apparent to those skilled in the art, any suitable handle may be attached or formed in the cover 13. Handles 24 are attached at two points, equidistant from each other, on the side of the container.

Figure 2:
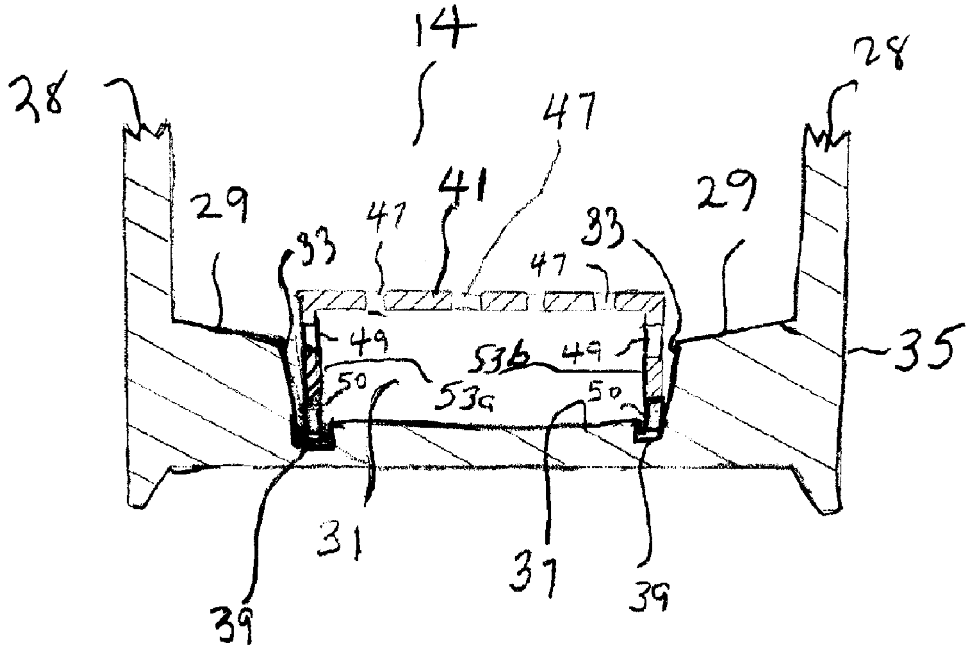
FIG. 2 is a sectional view of the device of FIG. 1, taken along section line A-A'.

In a preferred embodiment, the can 11 of FIG. 1 is partially shown in FIG. 2, as the bottom part 35 of the can 11 and in cross section along diametric section lines A-A', showing the interior 14 of the can 11. As shown in FIG. 2, the can 11 is shown enclosed by side wall 28. As shown for a preferred embodiment, the interior 14, of the can 11 is shown with a sloping gradient annular bottom surface 29, directing liquid, draining to the bottom surface 29, to be diverted to the sump shown as a sump channel 31, with sump channel walls 33 and sump channel floor 37, formed in the interior 14, of can bottom 35 of the container 11. The sump channel 31 is shown as partially separated from the container 11, and interior 14, by a strainer shown generally by numeral 41, shown in cross section, and shown and explained with reference to FIG. 5. The annular gradient of bottom surface 29, is shown for a preferred embodiment in the cross sectional view of FIG. 3, along section lines B-B'.

As would be recognized by those skilled in the art, the area of the annular bottom surface 29 and the volume of the sump channel 31 may be varied, by increasing the volume of the sump channel 31 or by decreasing the area of the annular bottom surface 29, or the reverse, without departing from the disclosed inventive principles.

Figure 3:
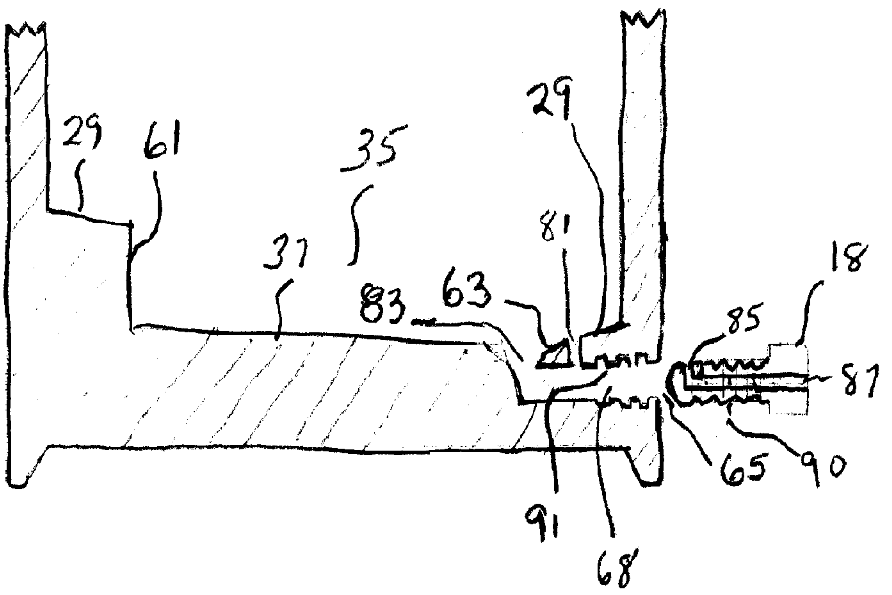
FIG. 3 is a sectional view of the device of FIG. 1, taken along section line B-B'.
Figure 5:
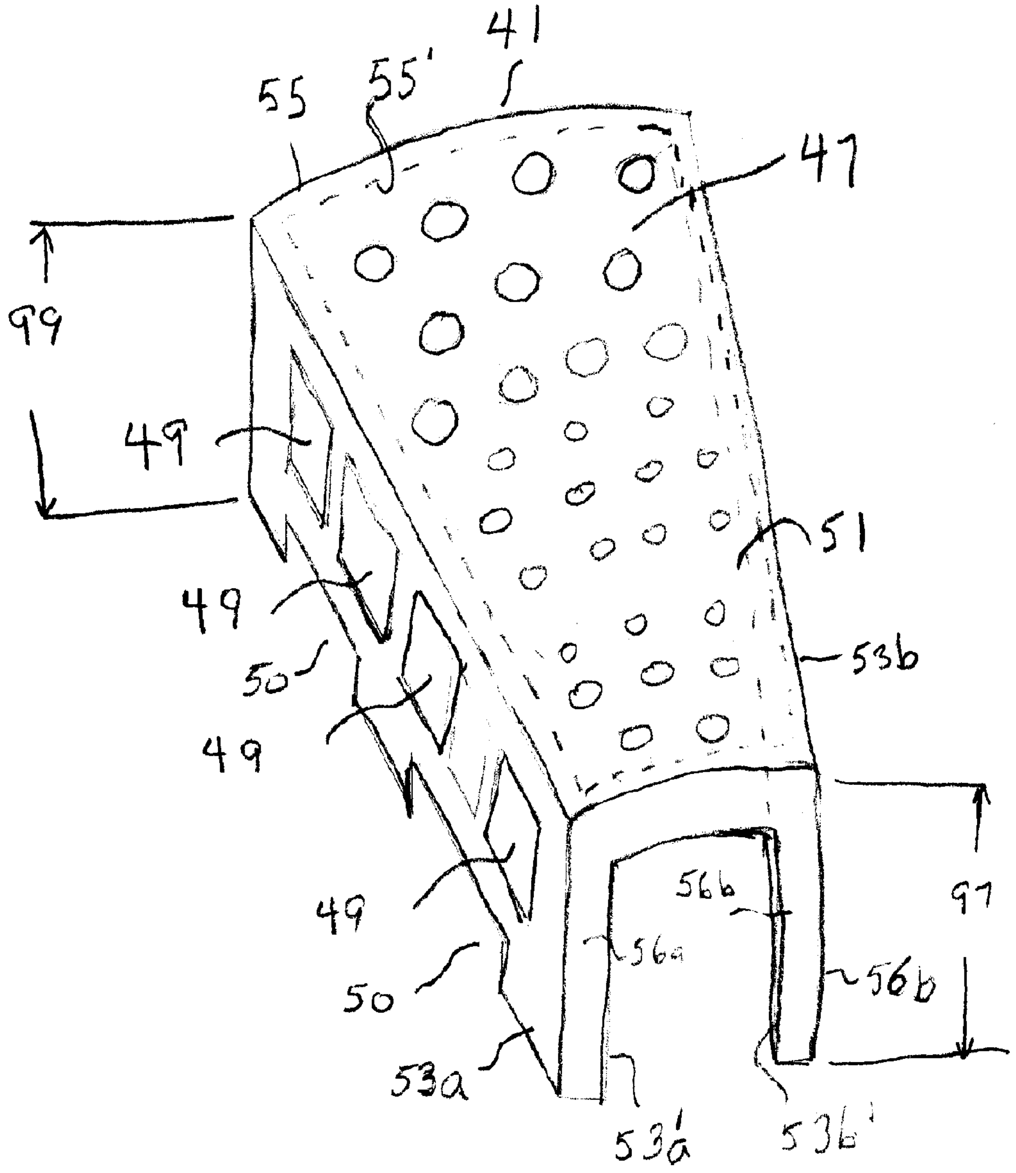
FIG. 5 is a perspective view of the strainer shown in FIG. 2, inserted in the sump channel.

Strainer 41, as shown for a preferred embodiment, in FIG. 5, comprises side walls 53*a* and 53*b*, with respective interior walls 53*a*' and 53*b*', and with back wall 55 shown with its interior wall 55'*a* in phantom and with front walls 56*a* and 56*b*. The references to "back and "front," are with reference to the can 11 and can bottom 35, and to the direction diametrically from the opening 65 and front wall 63, at the front of the sump channel 31, to the back or rear wall 61, where the depth or height of the sump channel 31 is higher and with reference to the annular gradient of the annular bottom surface 29 downward from the sump channel 31 back wall 61 to the sump channel front wall 63 and opening 65, as shown in FIG. 3.

The strainer 41 may be arranged to be to be removable from, and insertable into, said sump channel or to be integral with said container, without departing from the disclosed inventive principles.

The strainer shown for a preferred embodiment in FIG. 5, can be made with a gradient from the strainer 41 back wall 55 to the front walls 56*a*' and 56*b*', as shown by the height 99 of back wall 55 higher than the height 97 of front walls 56*a*, 56*b*, and which may be the same or different from the gradient from the sump channel 31, back wall 61 to the front wall height 63 at the sump channel 31, opening 65.

The strainer 41 placed in the sump channel 31, fits within the sump channel 31, walls 33, placing the strainer 41 in opposition to the interior 14, separating the interior 14 of the container 11 from the sump channel 31, and between the interior 14 of the container 11 and the volume of the sump channel 31. As shown for a preferred embodiment, the volume of the sump channel 31 can be defined by the separation between the interior 14 of the can 11 and the sump channel 31, as established by the dimensions of the enclosing strainer 41, which holds the solids held in the can 11 interior 14, from passing into the sump channel 31, while passing the liquids held in the can 11 interior 14, through strainer 41 into the sump channel 31. As disclosed the strainer is defined by the top 51 of the enclosing strainer 41, and side walls 53*a* and 53*b*, of the strainer 41, shown disposed within the side walls 33 of the can bottom 37, and the sump channel floor 37, of the sump channel 31, shown in the can bottom 35. The strainer 41, shown in cross section in FIG. 2, may comprise openings, as shown for a preferred embodiment in FIG. 5, as shown by a set of representative openings generally identified by numeral 47, passing through the top horizontal surface 51 of strainer 41 or a set of representative openings represented generally by numeral 49 through the side vertical surface 53*a*, 53*b*, of the strainer 41 and along the bottom of the strainer as shown by a set of openings represented generally by numeral 50, in sides 53*a* and 53*b*. As would be apparent to those skilled in the art, the surfaces of the strainer 41 may be orthogonal or may be arranged in a dome or polygon structure, without departing from the disclosed inventive principles.

The strainer 41, sides 53*a* and 53*b*, may be set in recesses 39 in the sump channel 31 and held in place by friction or by other suitable means, as would be apparent to those skilled in the art.

As shown for a preferred embodiment, the channel bottom 37 is disclosed in FIG. 3, represented in a partial view of the container 11 as shown in FIG. 1, in the lower part of the container 11, by the cross section taken on section line B-B'. As shown in FIG. 3, the annular bottom surfaces 29, as shown in a preferred embodiment for a circular or annular cross section wall 28, is constructed with an annular gradient from the annular side wall 28, as shown in FIG. 3, descending from a maximum height at sump channel 31, back wall 61, to a minimum height proximate the front wall 63 at the diametrically opposed side of the container 11 at sump channel 31, opening or outlet 65. In a preferred embodiment, the floor 37 of the channel bottom 31 is shown with as flat but may be made to have a gradient from a higher end at back wall 61 to a lower end at front wall 63.

At the bottom of the strainer 41, where it rests on the floor 37 of the sump channel bottom 37, are openings 50, to allow any liquid falling between the strainer 41 and the walls 33, of the sump channel bottom 31, to drain into the sump channel bottom 37 and out the drain hole 65.

The strainer 41 is not shown in FIG. 3 for purpose of explanation.

Shown for a preferred embodiment in FIG. 3 is the sump channel 31, outlet channel 65 for draining liquid flowing form the can 11 interior 14, to the annular bottom surface 29 and by the annular gradient in bottom surface 29, into the sump channel 31 and into outlet 65. An annular container is shown for a preferred embodiment.

Figure 4:
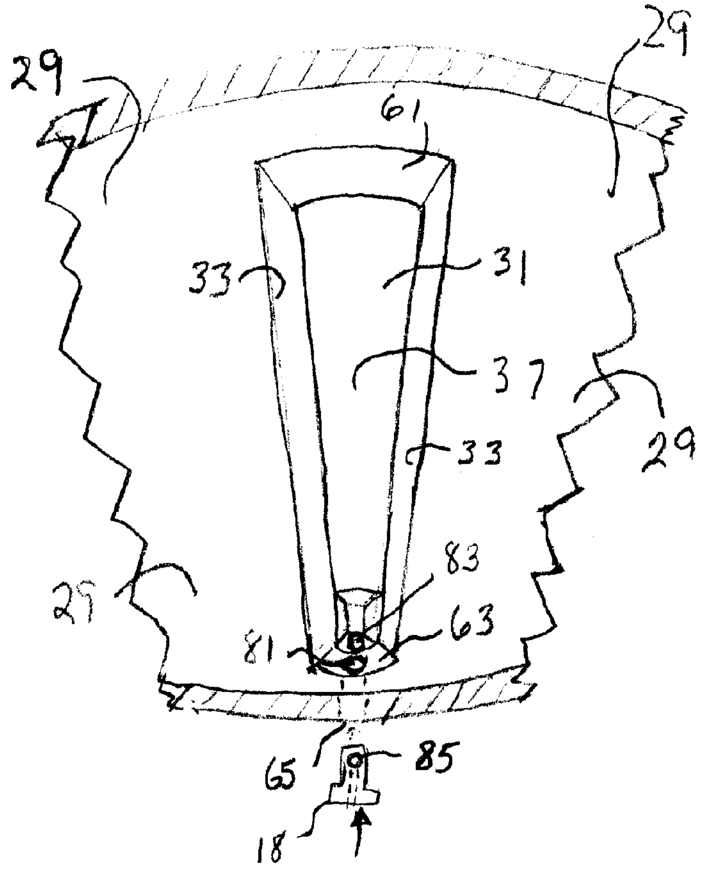
FIG. 4 is a sectional view of the device of FIG. 1, taken along section line C-C' and shows the annular bottom of the can in partial view.

FIG. 4, shows in a preferred embodiment, according to the disclosed inventive principles, the container of FIG. 1, in a cross section taken along horizontal section line C-C', and exposing in a top view, the bottom annular gradient surface 29 of container 11, with a downward sloping gradient from maximum height at back wall 61 to minimum height at front wall 63.

Additionally shown in FIG. 4, is sump channel 31 defined by walls 61, 33 and 63, which may be straight or with a gradient slope toward the sump channel bottom 37 and to drain hole 83, partially shown in the section view.

Draining of liquid from the container may be by sump channel 31 as shown through drain 83 and outlet channel 83 and outlet 65 leading to ambient at outlet 65. As disclosed in a preferred embodiment, the disclosed sump channel drain 83, is at the lower gradient end front wall 63 of the sump channel 31, and communicates with outlet channel 68. Alternatively, liquid may be drained through container bottom surface outlet 81 in the container annular bottom 29, to outlet channel 68 and to ambient through outlet 65. Outlet channel 65 may be arranged with a toggle or stop valve opening 85 integral in plug 18. The plug 18 may be arranged as a stop valve which may be turned to place the plug 18, hole 85 in opposition to opening 81 in the annular container bottom surface 29, allowing the liquid in the sump channel 31 to drain through the drain channel 87 of plug 18, to ambient.

In a preferred embodiment, the container is shown with an annular sidewall 28. As would be apparent to those skilled in the art, the container 11 may be in any convenient cross section or with a varying cross section along it axis 21-23, and may be in a continuous side wall as for an annular side wall or a discontinuous side wall as in a rectangular side wall cross section.

As would be apparent to those skilled in the art, the outlet channel 65, may be placed below the level of the sump channel bottom 37 or proximate the sump channel bottom surface 37, at the lowest level in said sump channel bottom or at a level within said sump channel. Alternatively, the outlet channel may be placed proximate the level of the container bottom 29, for example, at the lowest level in the container bottom gradient approximate the front end 63 of the sump channel 31. By lowest level is related to the orientation of the container 11 as shown in FIG. 1, with top cover 13 and bottom 35.

Outlet channel 65 may be stopped by a plug 18, which may be arranged with a thread 90 cooperating with mating thread 91 within outlet channel 65, to stop the flow of liquid or which may be removed to open sump drain opening 83 and outlet channel 65. As explained above, plug 18 may have a channel 87 bored along its centerline, with openings 85, 87, at either end to allow the flow of liquid from the container. As would be apparent to those skilled in the art, other suitable stops, plugs, or valves, may be used. The plug 18, opening may be arranged as a toggle or stop valve which may be turned less than a complete turn to place the plug 18 opening 85 in opposition to container bottom surface 29, outlet 81, to drain the sump channel 31 or may be removed to drain the sump channel 31.

In operation, the strainer 41 is fitted into the channel bottom 31, separating the interior 14 of container 11 from the sump channel 31, by the intervention of the openings 47, 49 and 50 in strainer 41. A mass of one or more solid and liquid materials, singular or a composite of liquid and solid materials, when placed in the interior 14 of container 11, will drain the liquid toward the can 11 bottom surface 29, to sump channel 31 and to the bottom surface 37 of sump channel 31 and out to ambient through outlet channel 83 and outlet 65, or where the opening 81 in the container bottom surface 29, is aligned with opening 85 in plug 18, through the plug 18, to ambient.

To clean the container, a liquid under pressure may be inserted into drain hole 65 to back flush the strainer 41 through outlet channel 65 and to displace from the container any solid or semi solid material, which may have passed through the strainer into the sump channel 31. Where a complete cleaning is required, for example with the container 11 empty, the strainer 41, when removable, may be removed for separate cleansing, the plug 18 inserted into the drain hole 65, and the container may be filled with cleaning solutions or disinfectant for a high pressure or scrub cleaning. The cleaning material may be expelled through the drain hole 65, the strainer reinserted in the sump channel 31 and with plug 18 placed back in the drain hole 65; the container is ready for use.

By sump channel bottom 37 is meant at least a part of sump channel 31, below the annular gradient bottom surface 29 for receiving and holding the liquid draining to bottom surface 29 and to sump channel 31. As would be apparent to those skilled in the art, the bottom surface 29, may be made continuous with the sump channel 31 so that there is not a clear discontinuity or break between the sump channel 31, front, back and side wall, surfaces and the bottom surface 29, or the sump channel 31 made be made integral and a part of the bottom surface 31 and visa versa.

The disclosed inventive principles are not limited to the shape disclosed for the sump channel and as would be apparent to those skilled in the art, other shapes may be used without departing from the inventive principles. The strainer may be as disclosed for a preferred embodiment or may be made integral with the can 11, However, as would be known to those skilled in the art, the channel bottom may be formed integral with the can.

As would be apparent to those skilled in the art, the invention may be practiced with the bottom surface 29 draining directly to the outlet 68, as well as disclosed, draining to outlet 68, through sump channel 31.

The invention claimed is:

1. A self draining container for draining liquid from a composite of liquid and solid materials in the interior of the container, comprising, a container, including a container interior;

said container including a container bottom and a container side wall;

said container bottom including a container bottom surface;

a sump channel in said container bottom;

said sump channel disposed below said container bottom surface;

said container bottom surface, including a container bottom surface sloping gradient, being disposed above said sump channel, and said container bottom surface being positioned in opposition to said container interior to support a composite of liquid and solid, and wherein said container bottom surface sloping gradient is in a downward direction to direct liquid draining onto said container bottom surface, to said sump channel.

2. The self draining container of claim 1, wherein, said sump channel comprises a sump channel bottom surface, a sump channel front wall, and a sump channel back wall, and wherein said container bottom surface sloping gradient is in a direction descending from a maximum height proximate said sump channel back wall to a minimum height proximate said sump channel front wall.

3. The self draining container of claim 1, wherein said container bottom surface sloping gradient is an annular gradient in a direction from said side wall to said sump channel.

4. The self draining container of claim 1, including a strainer disposed between said sump channel and said container bottom surface.

5. The self draining container of claim 4, wherein said strainer is disposed in said sump channel.

6. The self draining container of claim 4 wherein said strainer includes a strainer top surface; said strainer top surface includes a strainer top surface sloping gradient in a downward direction from said sump channel back wall to said sump channel front wall.

7. The self draining container of claim 2, including an outlet channel disposed proximate said sump channel bottom surface.

8. The self draining container of claim 7, wherein said container bottom surface includes a container bottom surface outlet and said container bottom surface outlet is disposed to allow liquid to drain through said container bottom surface outlet to said outlet channel.

9. The self draining container of claim 8, including an outlet channel plug; said outlet channel plug including a plug channel; said plug channel including at least two plug channel openings; and wherein at least one of said plug channel openings is arranged for placement in opposition to said container bottom surface outlet.

10. The self draining container of claim 4, wherein said strainer includes strainer side walls, and a strainer back wall and a strainer front wall; and wherein said strainer top surface includes a strainer top surface sloping gradient in a direction from said sump channel back wall to said sump channel front wall.

11. A self draining container for draining liquid from a composite of liquid and solid materials, comprising, means for receiving a liquid draining from a composite of liquid and solid materials;

means for supporting said composite of liquid and solid materials, including means for directing liquid, draining from said composite of liquid and solid materials onto said means for supporting said composite of liquid and solid materials, by a downward sloping gradient surface to said means for receiving a liquid draining from a composite of liquid and solid materials.

12. The self draining container of claim 11 wherein, said means for supporting said composite of liquid and solid materials includes means for draining said liquid from a minimum height of said downward sloping gradient surface.

13. The self draining container of claim 11, including means for straining said liquid draining from said composite of liquid and solid materials;

means for positioning said means for straining, proximate said means for receiving liquid draining from said composite, for straining said liquid draining from said composite.

14. The self draining container of claim 11, including, means for straining said liquid draining from said composite of liquid and solid materials;

means for positioning said means for straining between said means for supporting a composite of liquid and solid materials and said means for receiving said liquid draining from said composite of liquid and solid materials.

15. A self draining container for draining liquid from a composite of liquid and solid materials, comprising, a container; said container including a container interior, a container bottom and a container side wall; said container bottom including a container bottom surface; a sump channel in said container bottom; said sump channel disposed below said container bottom surface; said container bottom surface including a container bottom surface sloping gradient disposed above said sump channel and opposed to said container interior, wherein said sloping gradient is in a downward direction to direct liquid draining onto said container bottom surface, to said sump channel.

16. The self draining container of claim 15, including a strainer disposed between said sump channel and said container bottom surface, separating said sump channel from said container bottom surface.

17. The self draining container of claim 15, including an outlet channel and wherein said container bottom surface includes a container bottom surface outlet and said container bottom surface outlet is disposed proximate said outlet channel, to allow liquid to drain through said container bottom surface outlet to said outlet channel.

18. The self draining container of claim 17, wherein said container bottom surface is disposed with a maximum height above said sump channel and a minimum height above said sump channel, and wherein said outlet channel is disposed proximate said minimum height of said container bottom surface.

19. The self draining container of claim 18, including an outlet channel plug; said outlet channel plug including a plug channel; said plug channel including at least two plug channel openings; and wherein at least one of said plug channel openings is arranged for placement in opposition to said container bottom surface outlet for draining liquid from said container bottom surface.

20. The self draining container of claim 15, wherein said container bottom surface is disposed with a maximum height above said sump channel and a minimum height above said sump channel, and wherein aid container bottom surface includes a container bottom surface outlet disposed at said minimum height of said container bottom surface above said sump channel.

* * * * *